June 30, 1942.	C. L. BEARD	2,288,385
RIVET CUTTER
Filed Oct. 29, 1941
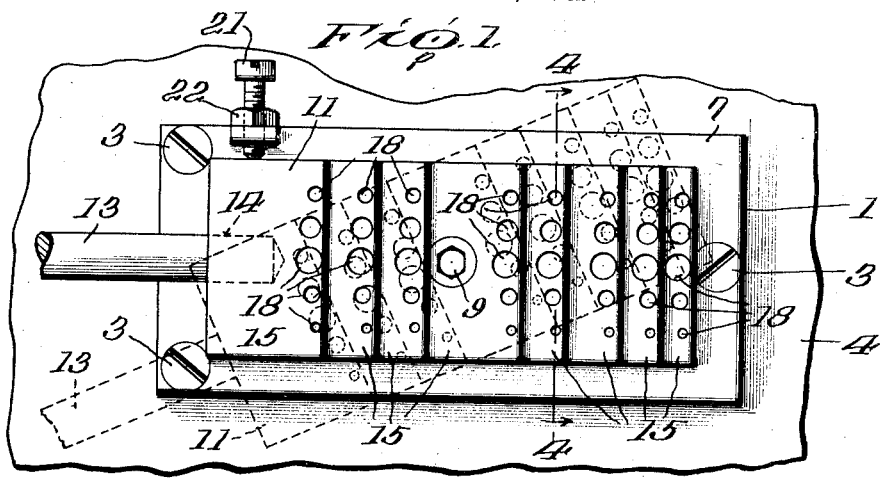
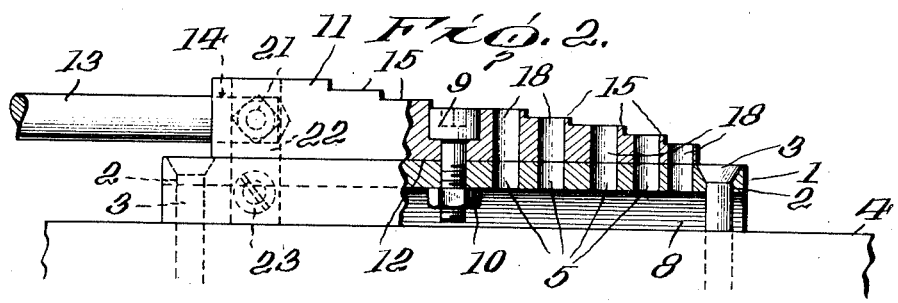
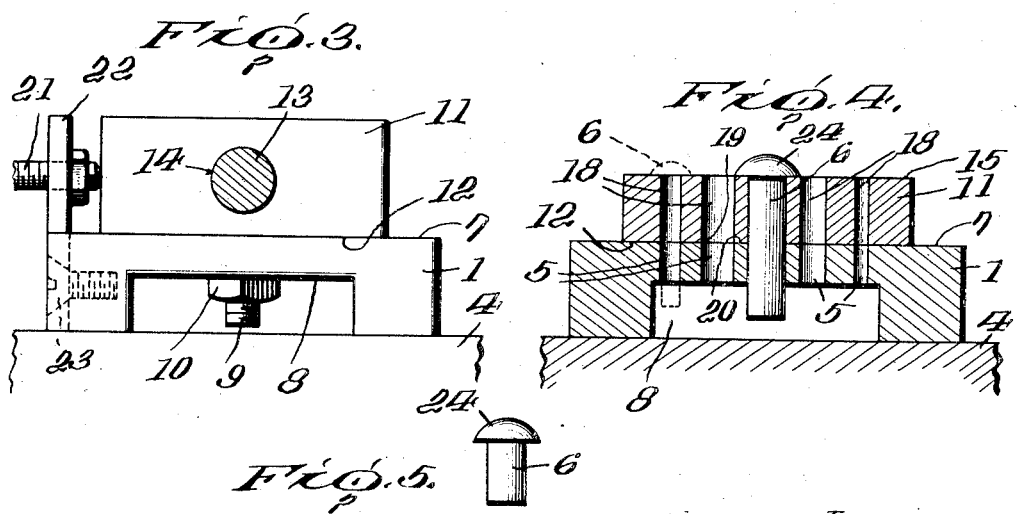
INVENTOR
Charles L. Beard
W. Britton Moore
ATTORNEY Patented June 30, 1942

2,288,385

UNITED STATES PATENT OFFICE 2,288,385

RIVET CUTTER

Charles L. Beard, Lancaster, Pa.

Application October 29, 1941, Serial No. 417,042

3 Claims. (Cl. 164—40)

This invention relates to a rivet cutter particularly adapted for cutting rivets for riveting aircraft sheet metal.

In preparing aircraft sheet metal for riveting, standard sized rivet holes are drilled therein and rivets must be accurately cut or sheared to fit these holes. If a rivet is oversize, that is, not accurately and uniformly sheared, the same is usually driven or forced through the sheet metal which necessarily deforms the metal and creates a weak spot. It has also been the practice to employ bolt cutters for shearing rivets, but this has proved objectionable and unsatisfactory because the end of the rivet shank is squeezed or compressed and slightly distorted so that the sides are flared or burred and the cut end is raised or bumped. In other words, the diameter is, what may be termed, flattened out, so that the rivet will not enter the drilled hole in the metal. Thus, it is necessary to file the face of the cut and the burr or overhang on the edges thereof.

The principal object of the present invention is to provide a cutting tool for severing or shearing standard size rivets without requiring any measuring on the part of the operator.

Another object is the provision of a rivet cutter adapted to cleanly shear or cut a rivet without leaving any burr on the sides, or high spot in the center of the cut, such as occurs when pliers, shears and bolt cutters are used.

Another object is the provision of a rivet cutter which is adapted to be readily clamped in bench vises and the like in airplane field service trucks and/or screwed to a work bench in a shop.

A further object is to provide a rivet cutter having a series of rivet holes graduated in length and diameter to accommodate rivets of varying standard sizes.

A still further object is to provide a rivet cutter having novel means for separating the series of rivet holes and assuring of the easy removal of the sheared rivets.

These and other objects and advantages will be apparent as the specification is considered with the accompanying drawing, wherein:

Figure 1 is a plan view of the rivet cutter in rivet receiving position, and showing, in dotted lines, the position it assumes after performing the rivet cutting operation;

Figure 2 is a side elevation of the rivet cutter, partly broken away to show the relation of the rivet holes in the top and bottom cutting plates;

Figure 3 is an end view of the rivet cutter, showing the adjustable stop member;

Figure 4 is a section on the line 4—4 of Figure 1; and

Figure 5 is an elevation of a rivet after being severed by the rivet cutter.

Referring more particularly to the drawing, wherein like reference characters refer to similar parts throughout the several views, numeral 1 designates a relatively flat, substantially rectangular base cutting plate having the threaded openings 2 for the reception of screws 3 to enable the plate to be removably secured to a flat work bench 4, or other suitable surface. If desired, the plate 1 may also be clamped in a bench vise and the like of airplane field service trucks, in an obvious manner not shown. The plate 1 is provided with a series of approximately eight spaced rows of rivet holes 5, preferably five spaced holes to each row, with the holes being graduated in size or diameter preferably ranging from one sixteenth to three sixteenths of an inch, to accommodate the standard sizes of aircraft rivets 6. The holes 5 extend from the flat top face 7 of the plate 1 downwardly therethrough and terminate in a substantially U-shaped, longitudinal slot or groove 8, in the underside of the plate, which provides clearance for the lower ends of the rivets and permits of the severed ends thereof dropping onto the working surface 4.

Pivotally mounted on the base plate 1, by means of an inset screw 9 and nut 10, is a substantially rectangular, top cutter or size plate 11, somewhat smaller in area than the base plate. The bottom face 12 of the plate 11 is relatively flat and slidably engages with the flat top face 7 of the base plate and is adapted to be pivotally moved or rotated thereover in a counter-clockwise direction, viewing Figure 1, by means of a suitable rod or handle 13, mounted in a recess 14 in one end of the plate 11. The top face of the cutter plate 11 is provided with a series of preferably eight, substantially flat steps or offsets 15 ranging in length or height from the rearmost one 16 which is approximately nineteen thirty-seconds to the forwardmost one 17 which is approximately five thirty-seconds of an inch. A series of five spaced rivet holes 18 are formed in each of the steps 15 in substantial alignment and coinciding in diameter with the series of rivet holes 5, in the base cutting plate 1. Thus, each of the corresponding pairs of rivet holes 5 and 18, respectively, constitute an opening for the insertion of a standard size rivet 6. As the steps 15 vary in height from approximately five thirty-seconds to approximately nineteen thirty-seconds of an inch, it will be noted that each of the coinciding pairs of rivet holes 5 and 18 correspondingly vary in height to accommodate the standard size aircraft rivets.

The steps 15 and holes 18 are preferably marked or graduated to readily indicate to the operator the proper hole within which to insert a rivet to assure of the same being sheared or severed to the required length. When it is desired to perform the cutting operation, a rivet 6, of the desired standard diameter, is selected and, after determining the length to which the same is to be cut, is inserted in the proper rivet hole 18 which is marked to designate diameter and height. With the rivet in position, the handle 13 is moved, in a counter-clockwise direction, viewing Figure 1, so that the rivet hole 18, having the rivet arranged therein, is moved relative to the corresponding hole 5 in the fixed base plate 1, from the full line to the dotted line position of Figure 1. This rotary movement of the top cutting plate 1, about its pivot 9, causes the bottom and top peripheral edges 19 and 20 of the rivet holes 18 and 5, respectively, to impart a rotary cut around the entire circumference of the rivet shank, resulting in the rivet being uniformly and evenly cut without leaving any burr or uneven area on the face or the sides of the cut. In other words, the initial relative rotary movement of the top and bottom cutting plates causes the rivet to be initially scored or slightly sheared circumferentially, which cutting is continued, throughout the rotary movement of the top cutter plate 11, until the rivet is completely sheared. This cutting action is distiguished from that effected by bolt cutters, pliers, shears and other cutting tools.

Due to the steps 15 being formed in the top plate 11, and separating the series of rivets receiving holes 18 the heads 24 of the rivets 6 are caused to overhang the side walls of the adjacent offset thus facilitating removal of the rivets by enabling the operator to engage the extended portion of the head 24 and lift the rivet from its hole.

In order to assure of the rivet holes 18 and 5 being in accurate alignment, an adjustable stop screw 21 is mounted in an upstanding bracket 22, suitably secured by a screw 23 or the like to the side of the base plate 1. The end of the screw 21 abuts the side of the top cutting plate 11 and, by adjustment thereof, assures of the proper alignment of the top cutting plate 11 with respect to the fixed bottom cutting plate. If it is desired to rotate the top cutting plate 11 in a clockwise direction, viewing Figure 1, the stop screw 21 and bracket 22 should be mounted on the opposite side of the base plate 1, in an obvious manner, not shown.

A rivet 6, sheared in the cutting plate in the manner just described, will be assured of accurately fitting a standard size hole drilled in aircraft metal, without the necessity of driving or otherwise forcing the same being through the metal with consequent danger of deforming the latter and creating a weak spot.

It is to be understood that various changes and improvements may be made in the present rivet cutting tool without departing from the scope and spirit of the appended claims.

Having thus described my invention:

What I claim is:

1. A cutting tool for aircraft rivets comprising a fixed base member having a series of aligned rivet receiving openings therein, said openings being of varying diameters, a cutting member rotatably mounted on said base member and being formed with a plurality of offset portions having a series of aligned rivet receiving openings therein, said openings being of varying length and diameter and coinciding with the openings in said base member, and means for rotating said cutting member relative to said base member for shearing a rivet arranged in two of said coinciding openings.

2. A cutting tool for aircraft rivets comprising a fixed substantially flat base member having a series of rivet receiving openings arranged in rows therein, each of said rows of openings being of varying diameters, a cutting plate rotatably mounted on said base member and being formed with a plurality of offset portions thereon, said offset portions being graduated in height and having a series of rivet receiving openings arranged in rows therein, said openings being of varying diameter and coinciding with the openings in said base member, and a handle for rotating said cutting member relative to said stationary base member for shearing a rivet arranged in two of said coinciding openings.

3. A cutting tool for aircraft rivets comprising a fixed substantially flat base member having a series of rivet receiving openings arranged in rows therein, each of said rows of openings being of varying diameters, a cutting plate rotatably mounted on said base and being formed with a plurality of offset steps thereon, said steps being graduated in height and having a series of rivet receiving openings arranged in rows therein, said openings being of varying diameter and coinciding with the openings in said base member, the openings in said steps being arranged adjacent the side walls thereof whereby the heads of rivets arranged therein will overhang the side walls of the steps to facilitate removal thereof, and a handle for rotating said cutting member relative to said fixed base member for shearing a rivet arranged in two of said coinciding openings.

CHARLES L. BEARD.